Nov. 10, 1970  W. C. RUDD  3,539,761
FORGE WELDING

Filed Feb. 5, 1969  2 Sheets-Sheet 1

INVENTOR.
WALLACE C. RUDD
BY
ATTORNEY

Nov. 10, 1970   W. C. RUDD   3,539,761
FORGE WELDING

Filed Feb. 5, 1969

INVENTOR.
WALLACE C. RUDD
BY
*Eli Weiss*
ATTORNEY

United States Patent Office 3,539,761
Patented Nov. 10, 1970

3,539,761
FORGE WELDING
Wallace C. Rudd, Larchmont, N.Y., assignor to American Machine & Foundry Company, a corporation of New Jersey
Filed Feb. 5, 1969, Ser. No. 796,702
Int. Cl. B23k 15/00
U.S. Cl. 219—121                    3 Claims

ABSTRACT OF THE DISCLOSURE

Metal workpieces that are to be joined by welding are brought to or near forge welding temperature by a first heating means such as a high frequency resistance heating means or a high frequency induction heating means. At the same time that the workpieces are being heated to their desired temperature by the first heating means or at a short interval of time thereafter, an electron beam from an electron beam generating means is directed to and impinges upon the metal workpieces to increase the temperature of the workpieces to make more plastic or fluid metal at the weld seam.

This invention relates generally to methods and apparatus adapted for joining by welding two metal workpieces and more particularly to the forge welding of longitudinal seams in a shaped metal strip to form a metal tube, the weld areas being brought to final temperature by electron beam heating means after having been initially heated to a first temperature.

It has become increasingly apparent that the ability to focus very large concentrations of electron beam power without having direct physical contact with the workpiece offers many important advantages; a major advantage being the minimizing of the total heat applied to the workpiece.

Electron beam welds, which approach the strength of the parent metal can be accomplished with vacuum type electron beam welding equipment and non-vacuum type electron beam welding equipment. Vacuum type electron beam welding has certain inherent disadvantages such as the requirement of pumping the vacuum system down after each loading, limitations in the size of the workpiece, and the difficulty encountered in manipulating large workpieces in a vacuum environment.

Non-vacuum type of electron beam welding avoids many of the difficulties above noted by bringing the beam directly into the atmosphere where it can be used to perform the welding functions desired.

In the non-vacuum type of electron beam welder in use today the orifice system is differentially pumped and designed to permit the section of the gun in which electrons are released to be at a pressure of the order of $10^{-5}$ torr, with the exit of the orifice system at atmospheric pressure. The electron beam is focused through the orifice system into the workpiece by a combination of electrostatic and electromagnetic electron optical lenses. A positive pressure, applied at a special gas protection orifice located just below the exit orifice of the gun, produces a flow of gas to the work area which directs contamination emanating from the work area away from the pumping orifices. This procedure appears to have proved to be very effective in minimizing contamination of the vacuum system, both by material vaporized from the work and by dust usually present in manufacturing areas. The protective gas orifice also permits control of the atomic number of the gas which is pumped into the vacuum system. The use of helium as the protective gas greatly minimizes absorption of beam energy and scattering of beam electrons by gas within the orifice system. Gas diffusing from the protective gas nozzle, in addition to minimizing contamination of the system, also helps control the atmosphere in the immediate vicinity of the weld.

A non-vacuum electron beam welding type of unit which operates in a satisfactory manner is that manufactured by Hamilton Standard Division of United Aircraft Corporation.

At the present time, the preferred commercially utilized method of welding two metal workpieces together to form a continuous seam or the longitudinal seam when forming metal tubing with electron beam welding generally involves heating the opposed edges of the workpieces with an electron beam until the edges become molten or liquid, and then removing the electron beam and allowing the molten metal to solidify. The problems involved with this method are considerable. The two workpieces must be locked in position relative to each other until the pool of molten metal solidifies; the pool of metal must not run off as, to do so, could cause a hole in the weld; extreme care must be exercised to avoid the inclusion of impurities within the weld as impurities trapped in the liquid metal will remain and become part of the weld and result in a defective weld. Additionally, a considerable amount of energy is required to bring the metal edges being joined to their liquid or molten state.

The rate of welding, and the forming of the weld seam is limited not only by the speed at which the workpieces can be brought to their molten state, but by the time required for the molten pool of metal to solidify. To move the workpieces or subject them to vibrations before the pool of metal solidifies could prevent the formation of a good weld.

In another method of joining by welding two metal workpieces, the edges of the workpieces can be brought to forge welding temperature by high frequency resistance heating means or by high frequency induction heating means.

When forming a tube, normally a strip of metal is shaped by forming rolls to urge the edges of the strip to converge to a weld point where they are forced together, generally by pressure rolls. The converging edges of the strip can be heated to welding temperature by an induction coil located around the tube a short distance in advance of the weld point, or by sliding contacts as disclosed in U.S. Pat. No. 2,818,488 entitled Tube Welding by W. C. Rudd et al. which heats the converging edges by high frequency resistance heating.

However, certain types of steels contain lines of segregation or planes of weakness. Thus, when the edges of these steels are forced together such as occurs when making tubes or structural members, particularly when the steel has a dimension of approximately $3/16$ of an inch or above, the forcing together of the edges during the forging action causes these segregated lines to be bent outward and at right angles to their original plane.

The scarfing or cutting off of the weld upset from the bottom and top surfaces of the weld exposes the ends of the bent lines of segregation or planes of weakness and surface cracks called hook cracks sometimes result in these lines.

By using, in combination, a first heating means such as a high frequency resistance heating means or a high frequency induction heating means together with an electron beam heating means the tendency to produce hook cracks is reduced without affecting the quality of the weld nor decreasing the rate of welding.

It is an object of this invention to use an electron beam to bring the edges of workpieces which are to be welded together to a final heat suitable for forge welding.

It is an additional object of this invention to bring the edges of workpieces which are to be welded together to a first temperature by high frequency resistance heating and to a final temperature by an electron beam, the final temperature being sufficient to bring the edges of the workpieces to a molten state suitable for forge welding.

It is another object of this invention to provide an improved weld of two workpieces brought to final heat by an electron beam.

It is still another object of this invention to increase the rate of welding of two workpieces brought to final heat by an electron beam.

It is yet another object of this invention to provide sufficient liquid metal so that oxides, inclusions, and extraneous material can be squeezed out to provide an improved weld of two workpieces brought to final heat by an electron beam.

It is also another object of this invention to provide a more economical and reliable method of welding two workpieces brought to final heat by an electron beam.

Other objects and many of the attendant advantages of this invention will be readily appreciated as the same becomes better understood by reference to the following detailed description when considered in connection with the accompanying drawings wherein.

In this invention, metal workpieces that are to be joined by welding are brought to or near forge welding temperature by a first heating means such as high frequency resistance heating means, of high frequency induction heating means. At the same time that the workpieces are being heated to their desired temperature by the first heating means or at a short interval of time thereafter, an electron beam from an electron beam generating means is directed to and impinges upon the metal workpieces to increase the temperature of the workpieces to make fluid metal at the weld seam.

The rate of welding is high for relatively thick materials, approximately 3/16 of an inch or above, as the real heat contribution is obtained from the high powered high frequency source; and the electron beam which is directed to impinge upon and heat the surface to be joined at or just prior to the weld point provides extra melting of the metals and much better uniformity of temperature than can be achieved across the interface by the use of the high frequency heating source separately.

The high frequency heating means contributes most of the heat to the metals to be welded. However, it does not produce an optimum uniformity of interface temperature and, as a result, heavy forging action is required to make a weld. The use of an electron beam heating means in combination with a high frequency heating means produces a more uniform interface temperature and substantially less forging pressure is required. It is only by decreasing the forging pressure that the bending outward of the plane of weakness can be avoided and the tendency to produce hook cracks is reduced.

Thus the electron beam produces, with its low power, a final molten face on the heated edges that are to be welded either where they come together or just downstream of the weld point. The molten metal together with surface impurities is squeezed out by the squeeze or forge rolls, substantially less pressure being required to form the weld than if the high frequency heating means were used without the electron beam heating means.

Figure 1:
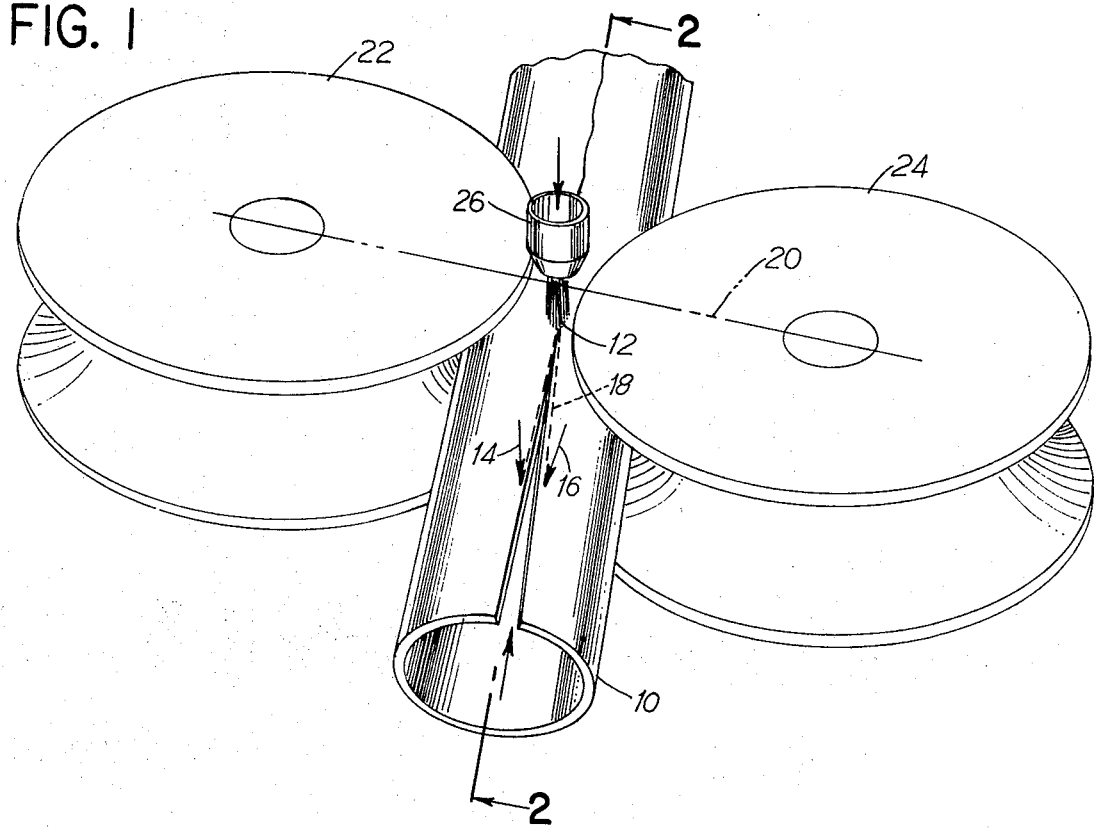
FIG. 1 is a view, in perspective, of structure in accordance with the principles of this invention.

Referring to FIG. 1 there is illustrated structure in accordance with the principles of this invention. A length of flat strip stock 10 is advanced through shaping rolls, the edges of the strip being positioned to come together to form a tube. The edges are welded together at a point 12.

Before reaching the weld point 12, the edges of the strip can be heated to a desired temperature by an induction coil positioned around the tube, or by the use of high frequency resistance heating means utilizing two sliding contacts as disclosed in U.S. Pat. No. 2,818,488 entitled Tube Welding by W. C. Rudd et al.

In those instances where high frequency resistance heating is utilized, contacts 14, 16 for the high frequency current are applied to the edges of the strip being shaped upstream from the weld point 12, and the high frequency current flows from one contact 14 along one edge of the strip to the weld point 12, then back along the other edge of the strip to the other contact 16 as illustrated by the dotted line 18. The current flowing through the edges of the strip 10 heats the edges of the strip to forge welding temperature. Actually, heating from the high frequency current ceases a small distance upstream from the intersection of the line 20 which extends through the centers of the squeeze rolls 22 and 24 with the weld seam being formed in the tube.

In those instances where high frequency resistance heating is utilized, the structure as disclosed in FIGS. 1 through 5 of U.S. Pat. No. 2,818,488 can be used, it being understood that the figures and description of Patent 2,818,488 is made a part of this description the same as if it had been actually incorporated herein.

An electron beam from an electron beam welding device 26 is positioned to impinge upon the heated edges of the strip 10 at or slightly upstream from the point 12. The additional heat applied to the facing metal edges of the tube by the electron beam improves the temperature distribution of the hot edges at the point 12 in addition to providing additional heat for the making of melted metal for producing the improved type of weld.

Figure 2:
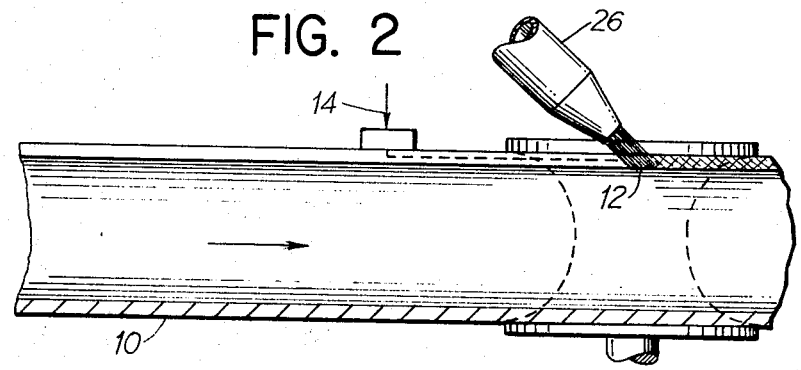
FIG. 2 is a view along the line 2—2 of FIG. 1.

Referring now to FIG. 2, there is illustrated a view along the line 2—2 of FIG. 1 showing the contact 14 riding on the top surface of the strip 10, a squeeze roll, and the electron beam generating means 26 positioned to direct an electron beam to impinge upon the edges to be welded at the weld point 12. It is to be noted that while the electron beam follows a path that is at an angle with the weld seam being formed, in some instances it may be desirable to have the electron beam follow a path that is perpendicular or at right angles to the seam being formed and the longitudinal axis of the tube.

Figure 3:
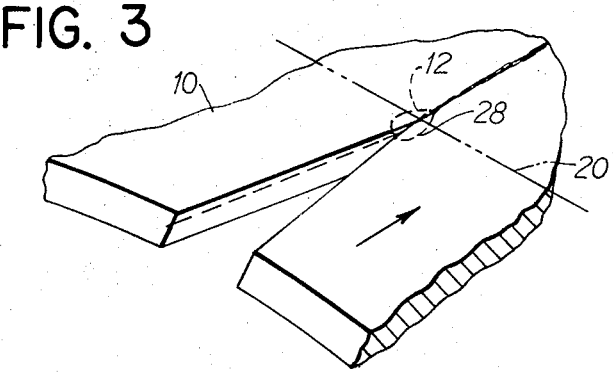
FIG. 3 is a view at the weld area, the metal forming rolls and metal heating means having been removed for purposes of clarity.

FIG. 3 is a view of the metal strip 10 at the weld area, the metal forming rolls and metal heating means having been removed for purposes of clarity. At the apex of the V, the edges of the strips are brought together. It is at this junction that the high frequency heating current crosses from one edge to the other edge. It is also at this junction that forging action normally occurs to create the upset that causes the undesired hook cracks. The area identified by reference numeral 28 which can surround the weld point 12 defines the target area for the electron beam; the target area including the apex of the V from the top surface of the strip 10 through to the bottom surface of the strip 10.

In operation, the use of the electron beam in combination with the initial heating of the edges that are to be welded together by means of the high frequency resistance or induction heating means results in the abutting faces of the member 10 being heated all the way through at the apex of the V; the heat from the electron beam providing additional melting of the metal at the apex V to provide better uniformity of temperature than is achieved when only a high frequency resistance or induction heating means is used.

Figure 4:
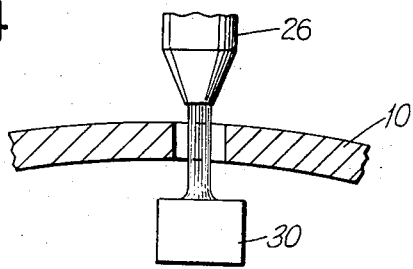
FIG. 4 is a view looking into the weld area from a point upstream from the weld area.

FIG. 4 is a view looking into the weld area upstream from the weld point 12. It is to be noted that while the contacts are not shown, when high frequency resistance heating is used the heating current flows along the sides of the two edges and the electron beam impinges on the sides of the two edges. In some instances a small portion of the electron beam may pass through the V gap, and, in those instances where a tube is being formed, will pass through and heat the opposite wall of the tube. If the heating of the opposite wall of the tube is not desired by the electron beam, a water-cooled absorber means 30 can be positioned within the tube to interrupt the electron beam.

Figure 5:
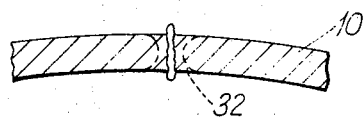
FIG. 5 is a view in section of a typical weld seam.

FIG. 5 illustrates, in section, a typical weld seam obtained when using the structure of this invention. In this invention, the high frequency heating means is the main source of heat, and the electron beam supplies the final heat. The result is a pinched center heat affected area 32. The absence of the large upset is to be noted. Only a small cast metal squeeze out is present.

Figure 6:
FIG. 6 is a view of a weld seam in section illustrating the flow lines of metals brought to final heat with high frequency resistance or high frequency induction heating means and joined by forging.

FIG. 6 is a view of a weld seam in section illustrating the flow lines of metal brought to final heat with high frequency resistance heating means or high frequency induction heating means only. It should be noted how the flow lines bend outward. Removal of the upset results in the cutting of the flow lines.

Figure 7:
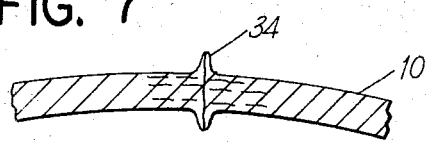
FIG. 7 is a view in section of a weld seam illustrating the improved flow lines of metals brought to final heat in accordance with the principles of this invention.

Referring to FIG. 7, there is illustrated a view in section of a weld seam brought to a first temperature by high frequency resistance heating means or high frequency induction heating means and to a second temperature by an electron beam heating means. It is to be noted that the flow lines are positioned end to end and are not reoriented at right angles to their normal positions as shown in FIG. 6.

The removal of the excess metal 34 from the top and bottom surfaces of the weld does not result in the cutting of any of the flow lines.

In operation, in this invention, the main source of welding power that raises the temperature of the workpieces to a first desired temperature can be a high frequency resistance heating means, high frequency induction heating means where the coil is positioned around the workpiece such as a tube or the like, or a high frequency resistance induction means where the induction coil is operated in the 3,000 to 10,000 cycles per second range, the coil being positioned over the tube rather than around it.

The electron beam generating means can be positioned to direct the electron beam either straight down on to the two workpieces or at a desired angle to the workpieces. The electron beam should be adjusted to heat the metal workpieces completely across the faces that are to be welded.

The high frequency heating means contributes most of the heat required to forge weld the two edges together. However, by itself, the high frequency heating means does not produce a temperature at the apex of the V that is as uniform as desired and, without the additional heat that is supplied by the electron beam, heavy forging action is required to make a weld. The electron beam in combination with the high frequency heating means provides more uniform temperature distribution across the faces that are to be welded at the apex of the V, and much less forging pressure is required to make the weld. The additional heat obtained from the electron beam forms a slight additional amount of melt on the faces that are to be welded.

Immediately downstream from the apex of the V, squeeze rolls force the two edges together to form a forge weld, the molten metal together with contained inclusions being squeezed out. In this invention, as there is additional melted metal present, in addition to a more uniform distribution of interface temperature, much less pressure is required to make the forge weld than would be required if high frequency heating without the electron beam were used. The reduced forge pressure reduces the tendency of bending and forming outward the planes of weakness.

Thus, the rate of welding relatively thick materials is high when using high frequency heating means in combination with electron beam heating as compared to electron beam welding alone as the high frequency heating means supplies the major portion of the heat required and the electron beam provides an additional melt to the faces at the apex of the V and a more uniform distribution of temperature.

Figure 8:
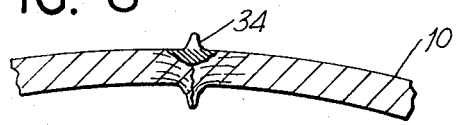
FIG. 8 is a view of another weld in accordance with the principles of this invention.

Referring to FIG. 8, there is illustrated the weld formed by another embodiment of the structure of this invention which can be used to avoid the forming of outbent fibers or hook crack problems on the outside surface of a pipe. In this application, the structure as disclosed in FIGS. 1 and 2 is used, however, the electron beam is adjusted to melt only the upper portion 34 of the workpieces that are to be welded together. The lower portion is not raised in temperature by heat from the electron beam. During the actual making of the weld, most of the melted metal is squeezed out at the top of the workpiece and the segregation lines are not bent outward. In the lower portion of the weld, however, the segregation lines are deformed as illustrated.

Both the top and bottom upsets, or the top or bottom upset, with their squeezed out impurities may be scarfed or cut-off as the weld is being made to leave a smooth surface with no sag or indentation.

Obviously many modifications and variations of the present invention are possible in the light of the above teachings. It is, therefore, to be understood that within the scope of the amended claims the invention may be practiced otherwise than as specifically described herein.

What is claimed is:
1. The method of welding together two metallic edges of elongated metal portions comprising the steps:
   advancing said portions along the line of the desired weld and subjecting said portions to pressure to force the edges together at the apex of a V, said edges being spaced apart upstream of said pex,
   causing a high frequency current to flow along the edges of the V to and from said apex, to bring said edges to or near forge welding temperature at said apex, said apex defining a weld point for said two edges,
   directing an electron beam into said weld point to impinge on the weld point throughout its depth and to further and more uniformly heat the metal throughout the depth of the weld point to the molten state, whereby the forcing together of the edges squeezes out the molten metal at the weld point and minimizes the possibility of inclusion within the weld lines of segregation of the metal.
2. The method claimed in claim 1 wherein the step of directing the electron beam includes directing the electron beam into said weld point in the presence of a non-vacuum atmosphere.

3. The method claimed in claim 1 wherein said electron beam is obliquely inclined to said line of the desired weld.

References Cited

UNITED STATES PATENTS

| | | | |
|---|---|---|---|
| 2,818,488 | 12/1957 | Rudd et al. | 219—59 |
| 2,818,489 | 12/1957 | Kalning et al. | 219—59 |
| 3,136,883 | 6/1964 | Radtke | 219—121 |
| 3,230,339 | 1/1966 | Opitz et al. | 219—121 |
| 3,234,352 | 2/1966 | Morris et al. | 219—59 |
| 3,248,512 | 4/1966 | Sommer | 219—8.5 |
| 3,294,928 | 12/1966 | Schafer | 219—67 |
| 3,414,697 | 12/1968 | Rudd | 219—8.5 |
| 3,426,173 | 2/1969 | Steigerwald | 219—121 |

JOSEPH V. TRUHE, Primary Examiner

U.S. Cl. X.R.

219—61, 67